Dec. 5, 1944.  C. R. CLOUSER  2,364,518
BALER
Filed Aug. 24, 1943
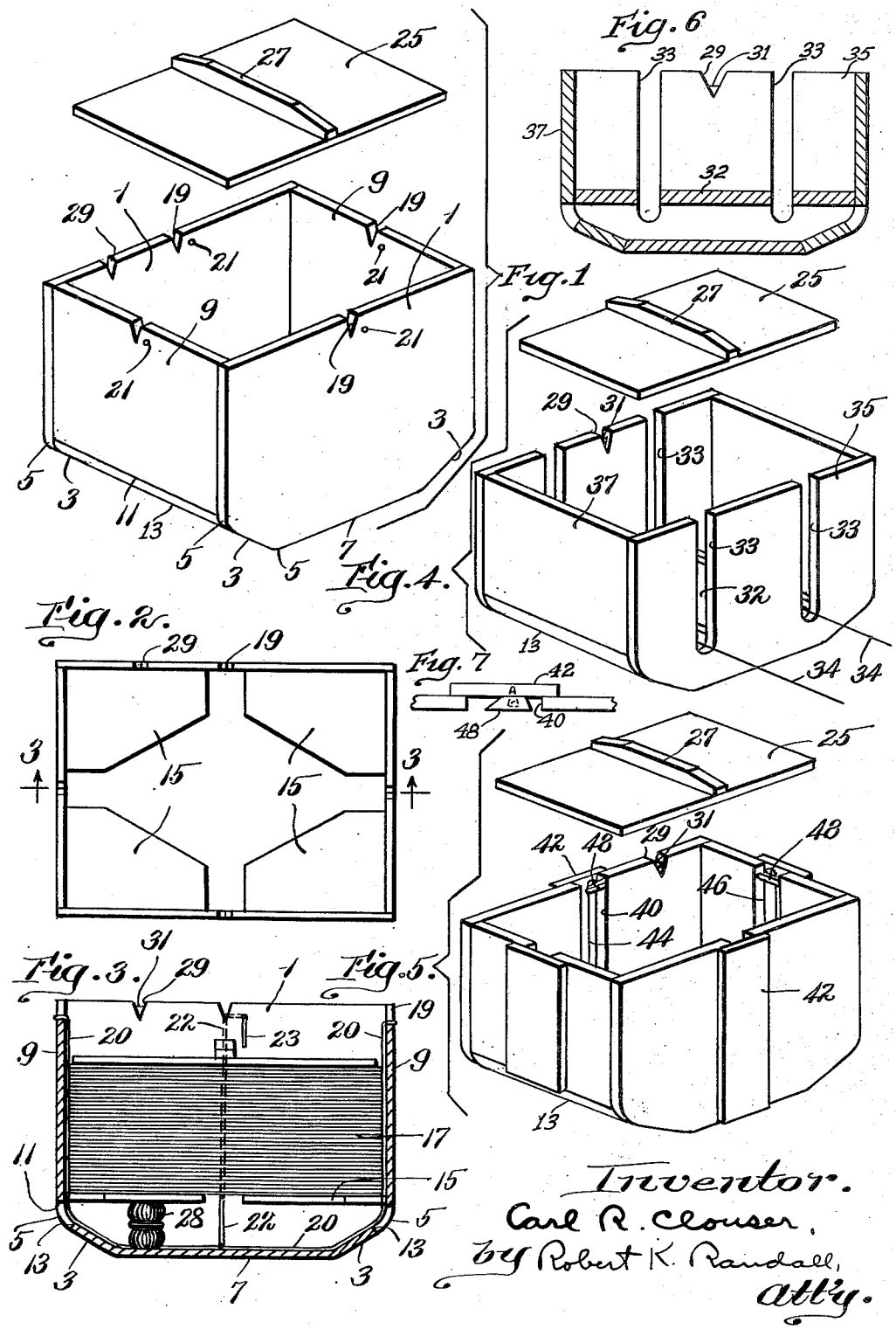
Inventor.
Carl R. Clouser,
by Robert K. Randall,
Att'y.

Patented Dec. 5, 1944

2,364,518

UNITED STATES PATENT OFFICE 2,364,518

BALER

Carl R. Clouser, North Weymouth, Mass.

Application August 24, 1943, Serial No. 499,801

7 Claims. (Cl. 100—19)

The present invention relates to a new and improved paper baler for houshold use.

As is well known, newspapers, wrapping papers, corrugated cartons, and other waste paper tend to accumulate around the house at a rate and to an extent which raises a problem of keeping them in safe and sightly storage pending final disposal. As waste paper has some value as salvage, it is desirable that the waste paper be saved instead of being disposed of by burning or dumping, but the difficulty has been to keep it in tidy manner and to package it in a shape acceptable to salvage collectors within the confines of the average house.

To provide a solution of the problem, the invention provides a novel paper baler in which old newspapers, wrapping paper and other waste paper stock can be kept in orderly and sightly manner until a bundle of maximum size for convenient handling has been formed, the invention also providing facilities for easily tying the bundle in compact and secure shape before removal. The invention further provides a baler of compact form and of sightly and unobtrusive appearance, such as would be acceptable within the service quarters of the average household, capable of being cheaply, simply and rapidly manufactured out of inexpensive materials and sold at a low cost.

Other aims of the invention, and the manner of their attainment, are as made plain in the accompanying description and drawing.

Illustrative embodiments of the invention are shown in the accompanying drawing, in which Fig. 1 is a perspective view of a preferred form of the paper baler, with the cover or follower raised.

Fig. 2 is a plan view of the baler of Fig. 1 with the cover removed.

Fig. 3 is a vertical longitudinal section on line 3—3 of Fig. 2, showing a stack of accumulated paper contained within the baler, and illustrating the storage compartment for the binding twine or other articles beneath the false bottom which supports the paper.

Fig. 4 is a view similar to Fig. 1 of an alternative form of the invention.

Fig. 5 is a view, also similar to Fig. 1, showing a second alternative form of the invention.

Fig. 6 is a vertical longitudinal section of the form of Fig. 4.

Fig. 7 is a detail showing the jam cleat of the embodiment of Fig. 5.

The improved baler is preferably made entirely out of wood, and is in the general form of a four-sided rectangular open-top box, having a bottom and vertical side walls, and having its interior length a few inches longer than the width of the average newspaper and its width an inch or so greater than half the length of the page of the average newspaper, so as conveniently to receive newspapers when folded once transversely across the middle of the page, in the form they have when delivered for sale. The lower corners of each side wall 1 are cut off obliquely as indicated at 3 and the angles of each end of the oblique portions are rounded off as indicated at 5, this provision and the consequent shortening of the base 7 forming a rocker bottom to facilitate rolling the baler over endwise into inverted position to dump out the accumulated contents when the time comes for disposal of the bundle, which is a rather substantial weight making this facility for overturning desirable.

The end walls 9 terminate at 11 at the beginning of the beveled off corners 3 and a space is left between the lower edges 11 of the end walls and the edge 13 of the members which extend across from one side wall 1 to the other to form the real bottom of the baler, so that when the device has been inverted the hands may be inserted in these openings to grasp the edges of the obliquely-disposed members at the ends of the bottom to lift the baler and shake out the contents.

To support the load of papers in flat relation in spite of the shortened base facilitating emptying, a false bottom is constructed at substantially the level of the bottom edges 11 of end walls 9. This comprises four members 15 having the shape in plan of right triangles with their two acute-angled corners cut off square, fitted into each of the four corners of the interior of the baler and each secured to one side wall and one end wall of the device.

To provide for ease and convenience in tying up a bundle of accumulated papers 17, Fig. 3, while within the baler and thus before becoming disarranged after assembly, notches 19 are cut at midlength of each of the four sides of the baler, these notches being sufficiently acute to permit the tying strings to be wedged securely into them. Thus, before any papers are put into the baler, a piece of twine 20 of sufficient length to be tied around the lengthwise dimension of any stack of papers which can be gotten into the baler is wedged into the notches 19 in the end walls at points a few inches back from its respective ends, and the intervening length is draped down into the interior of the baler through the spaces between adjacent false-bottom members 15 to lie along the real bottom of the device. Similarly, a piece of twine 22 adequate to go around the lesser dimension of the ensuing bundle has its end portions wedged in the notches 19 of side walls 1, with its intervening length hanging down inside the baler and the slack lying on the real bottom of the baler. For neatness, so that there will be no dangling ends of twine visible outside the baler, the few inches of twine extending out beyond the notches in which it is gripped are threaded inwardly through holes 21 respectively adjacent the several notches, to hang down inside the baler as indicated at 23. Thus, when the baler has become substantially filled with paper 17, the stack is pressed down by hand or by foot and the respective tying strings 20, 22, drawn tightly and each tied up end to end, whereupon the baler is rolled over into inverted position to empty out the compactly secured bundle.

To conceal the accumulating papers and to improve the appearance of the device, as well as to apply a restraining weight on the growing pile, a cover or follower 25 is provided to enter within the side walls 1, 3, and rest on top of the stack. A handle 27 conveniently in the form of a cleat extending crosswise at midlength, enables it to be picked up and removed each time more papers are to be added to the stack.

The false bottom arrangement provides a space below the stack in which a ball of twine 28 may be securely stored by being wedged between one of the corner pieces 15 and either the flat or inclined parts of the real bottom, so that a supply of binding twine can always be kept handy. For further convenience, an additional notch 29 is provided in one top edge, in which is embedded a metal blade having an exposed cutting edge 31, across which the twine may be drawn to sever it in preparing the lengths which are draped down inside the baler before the papers are put in. By being sunk in a notch too narrow to admit the fingers, the blade is entirely guarded against doing injury to the hands of the user.

In the form of Fig. 4, the general construction and functioning are as in the form just described, except that the false bottom 32 is composed of three transversely extending slats or members spaced apart from each other, and tying slots 33 are provided in side walls 35 with their lower ends in register with the spaces between false bottom members 32 and extending below the false bottom, whereby the tying strings 34 are threaded through the bottoms of slots 33, carried across beneath the false bottom on which the papers stand, and out the corresponding opposite notch 33, by inserting the fingers through the hand-hole between the bottom edge of end portion 37 and the inclined part of the real bottom corresponding to that at 3 in Fig. 3. The ends are then carried upward and tied at the top surface of the bundle of papers, and the bundle then emptied out by rolling the baler over into inverted position.

The form of Fig. 5 differs from that of Fig. 1 in that vertical covered recesses are formed at midlength of each of the four sides to hold the tying cords. The false bottom is preferably as in Fig. 1, and a wide slot 40 is cut down each wall to a point below the level of this false bottom, and bridged at the outward surface of the baler by an applied panel 42. The tying cords 44, 46, of proper length, are then draped down inside the baler and their end portions are looped over and wedged against jam cleats 48 fixed to the upper ends of panels 42, the extremities of the cords passing around the cleats and hanging down inside the baler out of sight. As in the case of Fig. 4, the same type of cover or follower 25 is used to cover and hide the papers being accumulated in the baler.

While I have illustrated and described certain forms in which the invention may be embodied, I am aware that many modifications may be made therein by any person skilled in the art, without departing from the scope of the invention as expressed in the claims. Therefore, I do not wish to be limited to the particular forms shown, or to the details of construction thereof, but what I do claim is:

1. A paper baler having in combination vertical side and end walls and a rocker bottom, and a load-support above the rocker bottom, the walls having recesses to hold bale-tying cords.

2. A paper baler comprising in combination a bottom and vertical side and end walls, the bottom having its end-portions sloping upwardly to join the end walls and its intermediate portion horizontal, and a false bottom disposed above such bottom and supporting the papers to be baled.

3. A paper baler having in combination vertical end walls, vertical side walls extending below the end walls and having their bottom edges of rocker shape, a load-support above such bottom edges, and a cross-member uniting the side walls below and in spaced relation to the load-support.

4. A paper baler having in combination vertical end walls, vertical side walls extending below the end walls and having their bottom edges of rocker shape, a load-support above such bottom edges, and a cross-member uniting the side walls below and in spaced relation to the load-support, the load-support having apertures giving access to the space between it and the cross-member.

5. A paper baler having in combination vertical end walls, vertical side walls extending below the end walls and having their bottom edges of rocker shape, a load-support above such bottom edges, and a cross-member uniting the side walls below and in spaced relation to the load-support, the side walls having recesses to hold bale-tying cords.

6. A paper baler having in combination vertical end walls, vertical side walls extending below the end walls and having their bottom edges of rocker shape, a load-support above such bottom edges, and a cross-member uniting the side walls below and in spaced relation to the load-support, the side walls having recesses to hold bale-tying cords, and the load-support having apertures permitting the cords to pass through and lie below the load-support.

7. A paper baler having in combination vertical side and end walls and a rocker bottom, and a load-support above the rocker bottom, the upper edges of the walls having recesses providing V-shaped angles in which the end-portions of bale-tying cords are jammed to retain such end-portions at substantially the level of the upper edges while the baler is being filled.

CARL R. CLOUSER.